(12) United States Patent
Hales et al.

(10) Patent No.: US 10,480,485 B2
(45) Date of Patent: Nov. 19, 2019

(54) CONTROL OF WIND TURBINES (71) Applicant: VESTAS WIND SYSTEMS A/S, Aarhus N (DK)

(72) Inventors: Kelvin Hales, Surrey (GB); Chris Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 366 days.

(21) Appl. No.: 15/519,784

(22) PCT Filed: Oct. 16, 2015

(86) PCT No.: PCT/DK2015/050321
§ 371 (c)(1),
(2) Date: Apr. 17, 2017

(87) PCT Pub. No.: WO2016/058617
PCT Pub. Date: Apr. 21, 2016

(65) Prior Publication Data
US 2017/0248123 A1    Aug. 31, 2017

(30) Foreign Application Priority Data
Oct. 17, 2014  (DK) .................. 2014 70643

(51) Int. Cl.
*F03D 7/02*      (2006.01)
*F03D 9/25*      (2016.01)

(52) U.S. Cl.
CPC ............ *F03D 7/028* (2013.01); *F03D 9/257* (2017.02); *F05B 2270/1033* (2013.01);
(Continued)

(58) Field of Classification Search
USPC .................................................. 290/44, 55
See application file for complete search history.

(56) References Cited

U.S. PATENT DOCUMENTS 9,018,782 B2 *   4/2015   Couchman ............. F03D 7/028
                                                    290/44
9,644,609 B2 *   5/2017   Turner .................. F03D 7/0292
(Continued)

FOREIGN PATENT DOCUMENTS

CN         1873219 A      12/2006
CN       101196432 A       6/2008
(Continued)

OTHER PUBLICATIONS

International Search Report for PCT/DK2015/050321, dated Dec. 18, 2015.
(Continued)

*Primary Examiner* — Pedro J Cuevas
(74) *Attorney, Agent, or Firm* — Patterson + Sheridan, LLP (57) ABSTRACT

The present invention relates to a method and control system comprising at least one cable temperature sensor for measuring cable temperature values for at least one power collection cable (50, 55) connected to a wind turbine (20) and a controller (110) arranged to generate and output an overrating control signal to the wind turbine (20). The output overrating control signal sets an amount by which the power output of the wind turbine (20) is to be overrated. It is determined whether the measured cable temperature values exceed a temperature set point and modifying the overrating control signal to reduce the amount of overrating if the temperature set point is exceeded.

7 Claims, 10 Drawing Sheets

(52) U.S. Cl.
CPC ............... *F05B 2270/1075* (2013.01); *F05B 2270/3032* (2013.01); *Y02E 10/723* (2013.01); *Y02E 10/725* (2013.01)

(56) References Cited

U.S. PATENT DOCUMENTS

| | | | | |
|---|---|---|---|---|
| 10,063,061 B2* | 8/2018 | Bartsch | ................. | F03D 7/0284 |
| 2008/0073912 A1* | 3/2008 | Fortmann | ............. | H02J 3/1885 |
| | | | | 290/44 |
| 2013/0257051 A1* | 10/2013 | Spruce | ................... | F03D 7/028 |
| | | | | 290/44 |
| 2013/0270827 A1 | 10/2013 | Couchman et al. | | |
| 2014/0015252 A1 | 1/2014 | Zhu et al. | | |
| 2014/0203563 A1* | 7/2014 | Bowyer | ................ | F03D 7/0284 |
| | | | | 290/44 |
| 2014/0248123 A1* | 9/2014 | Turner | ................. | F03D 7/0292 |
| | | | | 415/1 |
| 2015/0214726 A1* | 7/2015 | Hsiao | ..................... | H02P 9/107 |
| | | | | 290/44 |
| 2015/0349688 A1* | 12/2015 | Wagoner | ................. | H02P 9/007 |
| | | | | 290/44 |
| 2016/0196370 A1* | 7/2016 | Spruce | ................... | F03D 7/028 |
| | | | | 703/18 |
| 2017/0096983 A1* | 4/2017 | Hales | ..................... | F03D 7/028 |
| 2017/0328346 A1* | 11/2017 | Hales | ....................... | F03D 7/02 |
| 2017/0356420 A1* | 12/2017 | Hales | ..................... | F03D 7/028 |
| 2018/0156197 A1* | 6/2018 | Spruce | ................... | F03D 7/028 |
| 2018/0171979 A1* | 6/2018 | Spruce | ................... | F03D 7/0292 |
| 2018/0173215 A1* | 6/2018 | Spruce | .................... | F03D 7/046 |
| 2018/0180024 A1* | 6/2018 | Spruce | ................... | F03D 7/0292 |
| 2018/0180025 A1* | 6/2018 | Spruce | ................... | F03D 7/0292 |
| 2018/0180026 A1* | 6/2018 | Spruce | ................... | F03D 7/0292 |
| 2018/0187648 A1* | 7/2018 | Spruce | ..................... | F03D 7/028 |
| 2018/0187649 A1* | 7/2018 | Spruce | ................... | F03D 7/0292 |
| 2018/0187650 A1* | 7/2018 | Byreddy | ................. | F03D 7/028 |
| 2018/0223808 A1* | 8/2018 | Spruce | ..................... | F03D 17/00 |

FOREIGN PATENT DOCUMENTS

| | | |
|---|---|---|
| CN | 102257721 A | 11/2011 |
| CN | 102872556 A | 1/2013 |
| CN | 103328818 A | 9/2013 |
| EP | 2444659 A1 | 4/2012 |
| EP | 2482053 A1 | 8/2012 |
| WO | 2014048583 A1 | 4/2014 |
| WO | 2014114295 A1 | 7/2014 |
| WO | 2015014368 A1 | 2/2015 |
| WO | 2015135546 A1 | 9/2015 |

OTHER PUBLICATIONS

Danish Search Report for PA 2014 70643, dated May 12, 2015.
Chinese Office Action for Application No. 20158005627.1 dated Jul. 23, 2018.
Chinese Office Action for Application 201580056271.1 dated Mar. 28, 2019.

* cited by examiner

CONTROL OF WIND TURBINES

This invention relates to control of wind turbines and wind power plants and, in particular to control methods and apparatus which take into account the temperature of power collection cables when making control decisions.

The rated power of a wind turbine is defined in IEC 61400 as the maximum continuous electrical power output which a wind turbine is designed to achieve under normal operating and external conditions. Large commercial wind turbines are generally designed for a lifetime of 20 years and their rated power output takes into account that lifespan.

Wind turbines are commonly operated as part of a wind power plant comprising a plurality of wind turbines. U.S. Pat. No. 6,724,097 discloses operation of such a wind plant. The output of each turbine is determined and one or more turbines controlled so that the output power of one or more turbines is reduced if the total output exceeds the rated output of the plant. Such an arrangement is useful as the sum of the individual rated powers may exceed the rated output of the wind power plant, but at any one time not all turbines may be operating at full capacity; some may be shut down for maintenance and some may be experiencing less than ideal wind conditions.

While the approach taken in U.S. Pat. No. 6,724,097 deals with avoiding overproduction by a wind power plant, the total output of the plant may not reach the rated plant power if some turbines are shut down, for example for maintenance, or are not operating at their rated power, for example because the local wind conditions at those turbines do not allow rated power output to be achieved. It is economically desirable, therefore, to boost the output of one or more of the turbines to increase the total output of the power plant to its rated output.

Typically, one or more power collection cables are used to transport the generated power from a wind turbine, or from a plurality of wind turbines, for export to the grid. Power cables are designed to operate within a temperature range defined by published cable temperature ratings and exceeding this temperature rating can lead to cable failure due to thermal degradation of the insulation surrounding the cable conductor. For example, common maximum allowable temperatures at the surface of the conductor are 60, 75 and 90° C. Heat is generated as a function of the electric current passing through the cable core. Therefore, the current carried by a power cable is typically limited to avoid increasing cable temperature to above the design temperature.

As a result, turbines are typically controlled such that boosting of their output is prevented where there is a risk that the increased current from overproduction could lead to one or more collection cables exceeding their design temperature.

The present invention aims to provide improved methods and apparatus for controlling wind turbines.

According to a first aspect of the invention, there is provided a method of controlling a wind turbine, the method comprising the steps of generating and outputting an overrating control signal to the wind turbine, the overrating control signal setting an amount by which the power output of the wind turbine is to be overrated; measuring cable temperature values for at least one power collection cable connected to the wind turbine using at least one cable temperature sensor; determining whether the measured cable temperature values exceed a temperature set point; and modifying the overrating control signal to reduce the amount of overrating if the measured cable temperature values exceed the temperature set point.

According to a second aspect of the invention, there is provided a method of controlling a plurality of wind turbines connected to a common node from which power generated by the plurality of turbines is exported by at least one power collection cable, the method comprising the steps of generating and outputting an overrating control signal to the plurality of wind turbines, the overrating control signal setting an amount by which the power output of the plurality of wind turbines is to be overrated; measuring cable temperature values for the at least one power collection cable using at least one cable temperature sensor; determining whether the measured cable temperature values exceed a temperature set point; and modifying the overrating control signal of at least one of the wind turbines to reduce the amount of overrating if the measured cable temperature values exceed the temperature set point.

With methods according to the present invention, the power output of a wind turbine, or a plurality of wind turbines, is modified based on actual cable temperature measurements, rather than estimations of cable temperature which require safety margins to be factored in to account for possible inaccuracies. For example, inaccuracies in cable temperature estimations may arise from uncertainties about the thermal properties of the cables and of the installation environment. Since safety margins are not required with the present invention, power output can be increased beyond that possible with cable temperature estimations, while staying within cable temperature rating limitations. The step of modifying the overrating control signal may involve reducing the amount of overrating by any suitable amount in order to reduce the cable temperature. In certain embodiments, the step of modifying the overrating control signal comprises reducing the amount of overrating to zero.

The step of modifying the overrating control signal may comprise reducing the amount of overrating independently of the extent to which the temperature set point is exceeded. For example, the step of modifying the overrating control signal may comprise reducing the amount of overrating according to a predetermined control regime. In certain embodiments, the step of modifying the overrating control signal comprises incrementally reducing the amount of overrating based on the extent to which the temperature set point is exceeded.

The at least one cable temperature sensor may be provided separately from the at least one power collection cable. For example, the at least one cable temperature sensor may be a separate component that is attached to the outside of the at least one power collection cable at one or more locations along the length of the cable. The at least one cable temperature sensor may be integral with the at least one power collection cable. In certain embodiments, the at least one cable temperature sensor is a distributed temperature sensor extending along a substantial part of the length of the at least one power collection cable.

According to a third aspect of the present invention, there is provided a wind turbine control system comprising at least one cable temperature sensor for measuring cable temperature values for at least one power collection cable connected to the wind turbine; and a controller arranged to generate and output an overrating control signal to the wind turbine, the overrating control signal setting an amount by which the power output of the wind turbine is to be overrated, determining whether the measured cable temperature values exceed a temperature set point and modifying the overrating control signal to reduce the amount of overrating if the temperature set point is exceeded.

Embodiments of the invention will now be described, by way of example only, and with reference to the accompanying drawings, in which.

The following description addresses the general control of turbines in a wind turbine power plant, the control of output power from those turbines, and the adjustment of this control based on cable temperature. It describes control regimes which are both devised by a multi-turbine controller and sent as commands to individual turbines, and control regimes which are implemented by individual turbines and then communicated to a multi-turbine controller such as a power plant controller.

Figure 1:
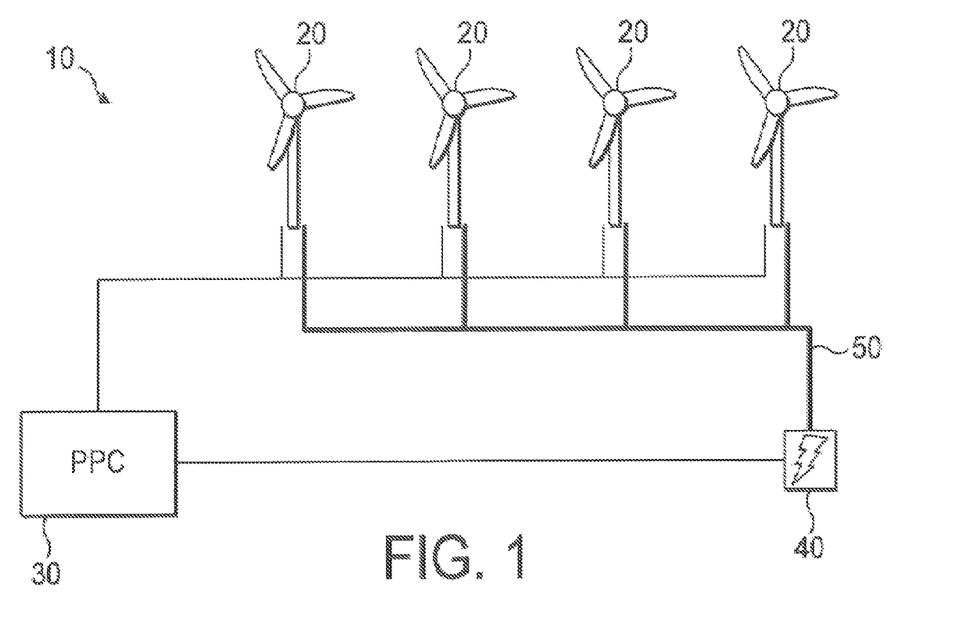
FIG. 1 is a schematic view of a known wind power plant control regime using a power plant controller.

FIG. 1 shows, schematically, a conventional wind power plant 10 comprising a plurality of wind turbines 20 each of which communicates with a power plant controller PPC 30.

The PPC 30 can communicate bi-directionally with each turbine. The turbines output power to a grid connection point 40 using collection cables 50, as illustrated by the thick line. The collection cables 50 are typically buried, along at least a portion of their length, in a trench which has been dug in the ground and back-filled, typically with soil or sand.

In operation, and assuming that wind conditions permit, each of the wind turbines will output maximum active power up to their nominal set point. This is their rated power as specified by the manufacturer. The power that is output to the grid connection point is simply the sum of the outputs of each of the turbines.

Although the turbines 20 are shown schematically in FIG. 1 as being arranged in series, this is just one example arrangement. For example, the turbines 20 may be arranged in clusters, or sub-sets of turbines, as illustrated in FIG. 2.

Figure 2:
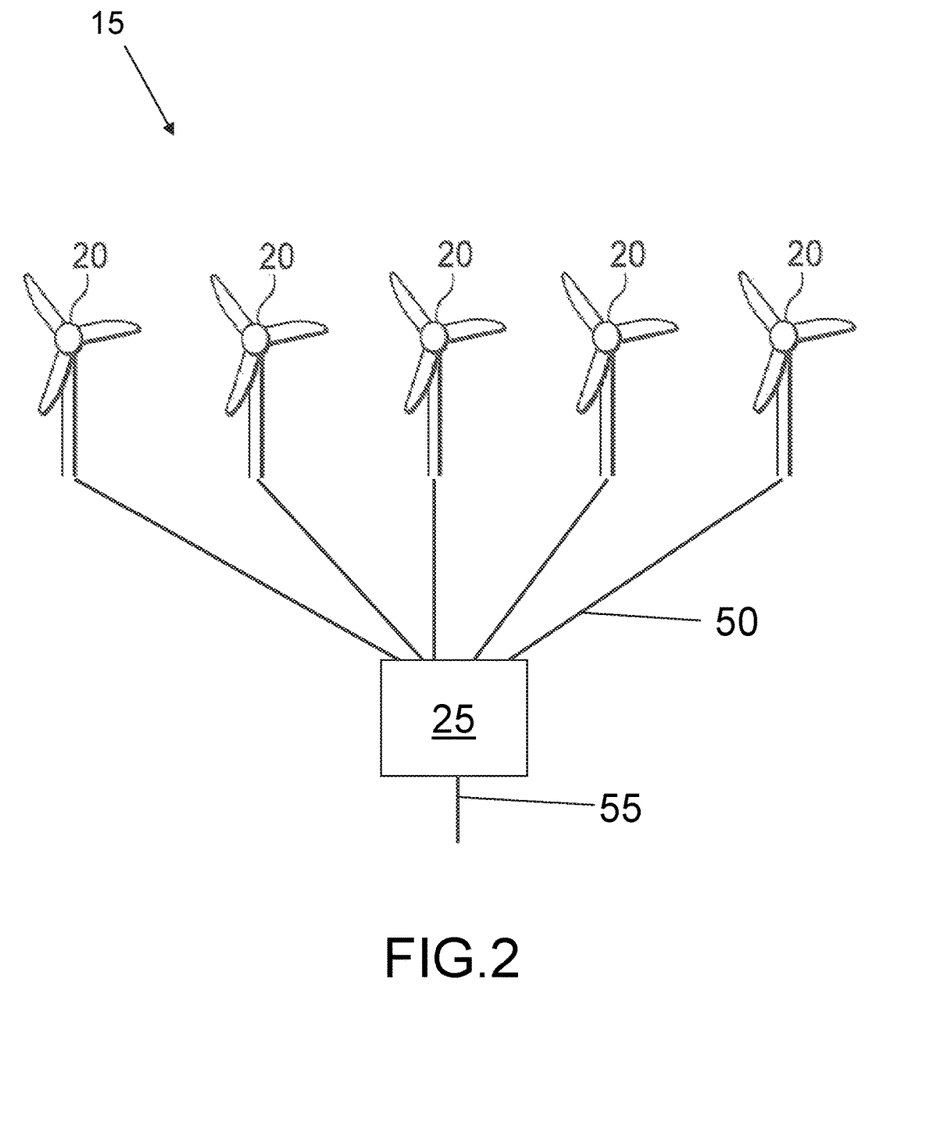
FIG. 2 is a schematic view of a known cluster, or sub-set, of a known wind power plant.

FIG. 2 shows, schematically, a wind turbine cluster 15 comprising a plurality of wind turbines 20 each having a power collection cable 50 running to a node 25. The generated power is then transported by a further power collection cable 55 from the node 25 to the grid connection point (not shown) either directly or via an adjacent node. The collection cable 50 of each turbine 20 should have a current-carrying capacity, i.e. a current rating, which exceeds the level of electrical current generated by the turbine 20 while operated at its rated power output. As the collection cable 55 running from the node 25 carries current from each of the turbines 20 in the cluster 15, it should have a current rating which is correspondingly larger than that of the collection cables 50 running from each turbine 20. For example, where the cluster 15 comprises five turbines 20, each with a rated power of 2 MW, the collection cable 55 running from the node 25 will typically have a current rating of at least 10 MW to enable all of the turbines to be simultaneously operated at their rated power outputs, without power restrictions due to insufficient cable current-carrying capacity.

Figure 3:
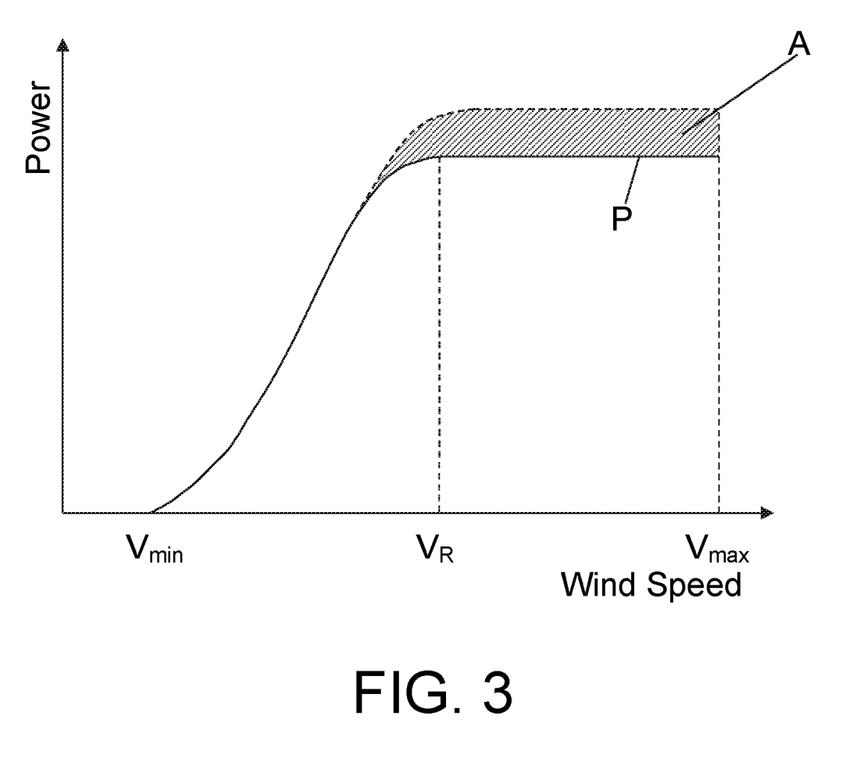
FIG. 3 is a graph of wind speed against power showing a power curve for a typical wind turbine.

FIG. 3 illustrates a conventional power curve P of a wind turbine plotting wind speed on the x axis against power output on the y axis. Curve P is the normal power curve for the wind turbine and defines the power output by the wind turbine generator as a function of wind speed. As is well known in the art, the wind turbine starts to generate power at a cut in wind speed $V_{min}$. The turbine then operates under part load (also known as partial load) conditions until the rated wind speed is reached at point $V_R$. At the rated wind speed, at point $V_R$, the rated (or nominal) generator power is reached and the turbine is operating under full load. The cut in wind speed in a typical wind turbine is 3 m/s and the rated wind speed is 12 m/s.

Point $V_{max}$ is the cut out wind speed which is the highest wind speed at which the wind turbine may be operated while delivering power. At wind speeds equal to and above the cut out wind speed the wind turbine is shut down for safety reasons, in particular to reduce the loads acting on the wind turbine.

As described above, the rated power of a wind turbine is defined in IEC 61400 as the maximum continuous electrical power output which a wind turbine is designed to achieve under normal operating and external conditions. Therefore, a conventional wind turbine is designed to operate at the rated power so that the design loads of components are not exceeded and that the fatigue life of components is not exceeded.

As shown in FIG. 3, the turbine can be controlled such that it produces more power than the rated power, as indicated by shaded area A. The term "over-rating" is understood to mean producing more than the rated active power during full load operation. When the turbine is over-rated, the turbine is run more aggressively than normal and the generator has a power output which is higher than the rated power for a given wind speed.

The over-rating is characterised by a transient behaviour. When a turbine is over-rated it may be for as short as a few seconds, or for an extended period of time if the wind conditions and the fatigue life of the components are favourable to over-rating.

The over-rating power level may be up to 30% above the rated power output.

The PPC 30 is shown schematically in FIG. 1 for ease of illustration. It communicates with each of the turbines and can receive data from the turbines, such as data relating to pitch angle, rotor speed, power output, etc and can send commands to individual turbines, such as set points for pitch angle, rotor speed, power output, etc. The PPC 30 also receives commands from the grid, for example from the grid operator to boost or reduce active or reactive power output in response to demand or a fault on the grid. Although not shown in the schematic figure, each wind turbine also has its own controller which is responsible for operation of the turbine and communicates with the PPC 30.

The PPC 30 receives power output data from each of the turbines and is therefore aware of the active and reactive power output by each turbine and by the plant as a whole at the grid connection point 40.

If required, the PPC 30 can receive an operating set point for the power plant as a whole and divide this among each of the turbines so that the output does not exceed the operator assigned set point. The active power plant set point may be anywhere from 0 up to the rated power output for the plant. The "rated power" or "nominal power" output for the plant is the sum of the rated power output of the individual turbines in the plant. The power plant set point may even be above the rated power output of the plant, i.e. the whole plant is over-rated. This is discussed further below.

Figure 4:
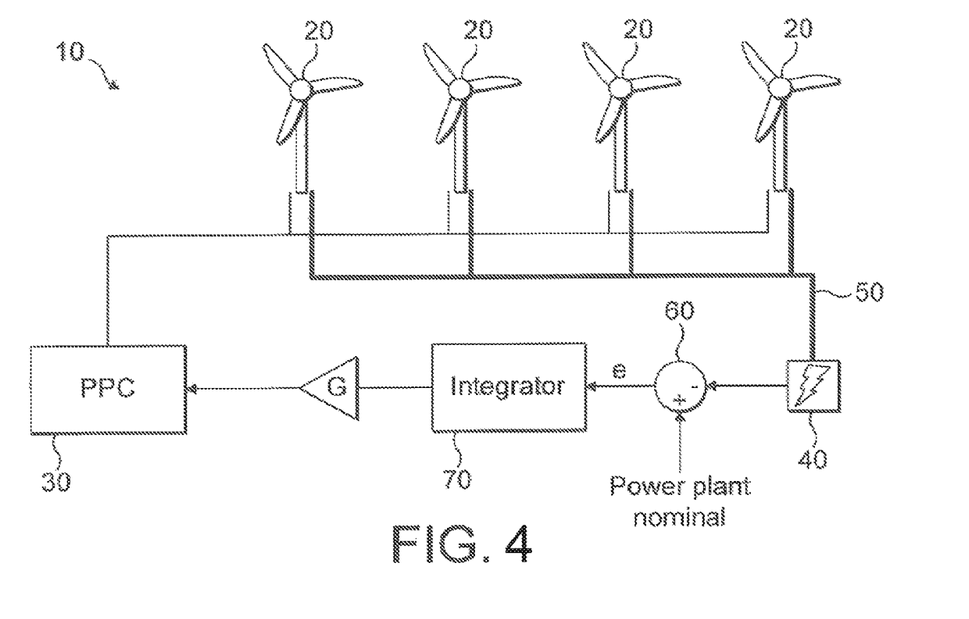
FIG. 4 is a schematic view of a further known wind power plant control regime using a power plant controller.

FIG. 4 shows an arrangement in which an over-rating signal is provided to the turbines 20. In this example, instead of receiving an input directly from the grid connection point 40, the power plant controller 30 receives a signal which is a measure of the difference between the total power plant output and the nominal power plant output. This difference is used to provide the basis for over-rating by individual turbines. The actual output of the power park is subtracted from the nominal or rated output of the power park at subtractor 60. The difference, shown as error signal e in FIG. 4 is input to an integrator 70. The integrator includes in-built saturation which prevents integral wind up which is a well-known problem in controllers where a large change in set point occurs and the integral terms accumulate a significant error during the rise (wind up), thus overshooting and continuing to increase as this accumulated error is offset by errors in the other direction (unwound).

The output from integrator 70 is input to a gain G which scales the integrator output to provide an over-rating amount which is then provided to the PPC 30 and sent by the PPC 30 to each of the turbines 20. In theory, only a single turbine may be over-rated, but it is preferred to over-rate a plurality of the turbines, and most preferred to send the over-rating signal to all the turbines. The over-rating signal sent to each turbine is not a fixed control but an indication of a maximum amount of over-rating that each turbine may perform. Each turbine has a controller which will determine whether the turbine can respond to the over-rating signal and, if so, by what amount. Where the turbine controllers determine that conditions are favourable and implement the over-rating signal, the output of the power plant will rise and so the error signal produced by the subtractor 60 will decrease. The integrator will reach equilibrium as the error either reaches zero or the integrator saturates. The turbine controller may be located at the turbine, at a cluster of turbines, or centrally, as described below.

Thus, in this example an over-rating signal is generated which is indicative of the amount of over-rating that may be performed by turbines of the power plant as a whole and is the same for each turbine. Each turbine responds individually to the over-rating signal in accordance with its controller. If conditions are such that the total control results in over-rating that threatens to exceed the power plant nominal output, the difference will reduce and individual controllers will reduce the amount of over-rating applied.

Figure 5:
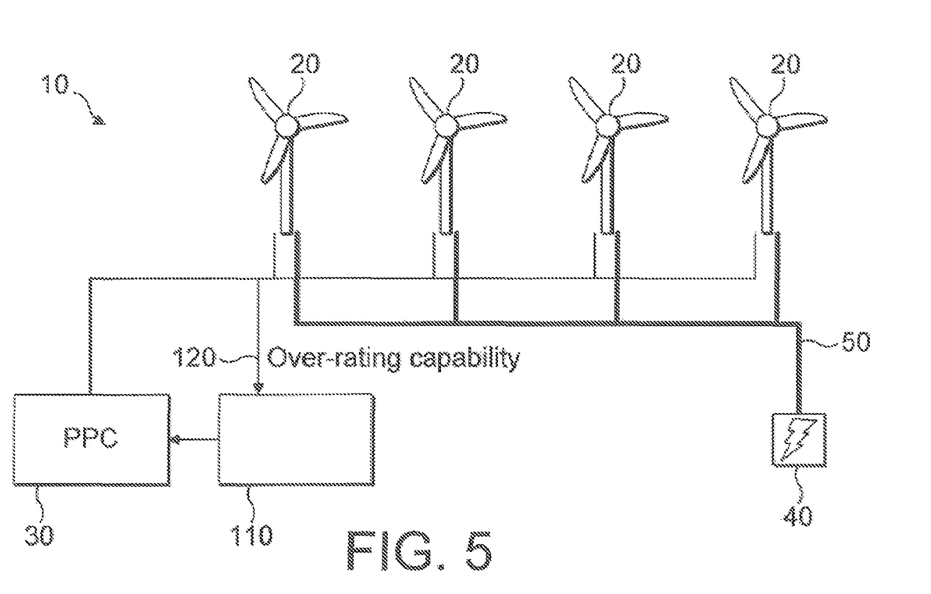
FIG. 5 is a similar view to FIG. 4 showing a refinement of the control regime.

In the previous example, the same over-rating set point signal is sent to each turbine using the total power plant output to provide a control input. In the embodiment of FIG. 5, each turbine is given its own over-rating amount by a central turbine controller 110. Thus in FIG. 5, a central controller 110 provides an input into the PPC 30. The central controller 110 receives an input 120 from each turbine which indicates the over-rating capability of that turbine. The central controller 110 then calculates an over-rating value for each turbine based on the present over-rating capability of that turbine and communicates that value to each turbine via the PPC 30. Of course the PPC 30 will take other factors into account, such as the need to ensure that the total power output does not exceed the rated output for the power plant.

Thus FIGS. 4 and 5 illustrate ways in which the over-rating of each turbine may be implemented via a power plant controller either by generating a common over-rating command for each turbine or by generating an individual over-rating command for each turbine. In these examples, the output of turbines is over-rated as the total output of the power plant is below the nominal output of the plant. This could be for a variety of reasons. For example, if the total rated output of all turbines is equal to the rated output of the power plant, over-rating may be used if some turbines are shut down for maintenance or are not operating at rated power, for example because the local wind conditions do not permit it.

Alternatively, the power plant may be designed to have a rated power output that is higher than the sum of the rated outputs of all the turbines. This is advantageous as over-rating may then be used even when all turbines are at rated output. This enables the plant operator easily to take advantage of changes in operating during favourable market conditions by using over-rating and so boosting income generated from the power plant. The operator may choose to over-rate at any time when additional revenue is required, even if the market data or the tariffs are not particularly favourable at the time. This gives the operator the ability to generate additional cash-flow which may be required for a variety of business reasons.

Thus, over-rating can be used to boost the output of individual turbines in response to a detected shortfall in power plant output or in response to external economic conditions.

However, over-rating carries inherent risks, particularly to the integrity of turbine and power plant components, such as power collection cables, and it is important to control the extent to which over-rating is used. One way in which this may be achieved is for each turbine to be controlled within the limits of hard and/or soft constraints programmed into the turbine controller, or the PPC, as discussed below.

A turbine has hard constraints defined as the maximum and minimum torque and speed at which it can operate. These constraints are imposed by the controller and dictated by factors such as noise limits, gearbox lubrication, component lifetime etc. These constraints are referred to as hard constraints as the controller may not violate them except in the extreme case of performing a shutdown. Although these constraints are rigid, they may vary over time.

The controller also imposes soft constraints which are intended to prevent the turbine shutting down during over-rating, typically as thermal limits or maximum generator speed are approached. A temperature increase in key components will occur during overrating, for example throughout the drive train, and could cause a shutdown to be triggered. Soft constraints may be lower than hard constraints but result in the controller reducing the amount of overrating rather than performing a shut down. Thus the turbine controller may include soft constraint values for drive train related parameters and generator speed. When the controller detects that a measured value is approaching a soft constraint value the over-rating signal is reduced.

The controller includes soft constraints for cable temperature values to prevent damage to the collection cables caused by exceeding their temperature rating during overrating. The temperature of the cable is dependent on several variables including the current flowing through the cable conductor, the electrical resistance of the conductor, the ambient temperature and the ability of the cable to dissipate heat, the latter of which depends on the cable geometry and its surroundings. The controller makes assumptions about these variables to calculate values of temperature along the length of the cable using a cable temperature model.

To allow for uncertainties in the calculation, the controller is typically programmed to add a safety margin to the temperature values calculated to ensure that the temperature cable is not underestimated. The controller then limits over-rating where the calculated cable temperature equals or exceeds the temperature rating of the cable.

Figure 6:
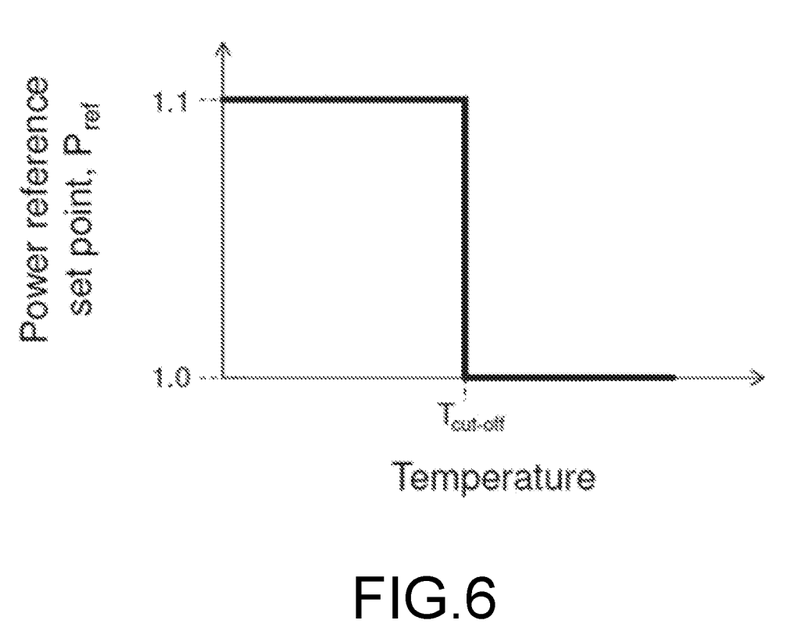
FIG. 6 is a graph illustrating cut-off control of an amount of overrating in response to changes in cable temperature.

FIG. 6 shows a graph illustrating cut-off control of the amount of over-rating in response to the calculated temperature of the cable. The x-axis of the graph indicates the maximum temperature along the length of the cable, as calculated by the controller and the y-axis indicates the power reference set point output by the over-rating controller, on the basis of which the generator output is controlled. A value of $P_{ref}$ of 1.0 corresponds to the rated or nominal power and a value of $P_{ref}$ greater than 1.0 indicates an overrating set point for which the controller requires the generator to produce more than its rated power. In this example, the value for $P_{ref}$ is 1.1, indicating that the controller requires the generator to produce 10% more than the rated power. Overrating is permitted up to a maximum temperature indicated by $T_{cut-off}$. Once the cable temperature is calculated to have reached $T_{cut-off}$ at any point along the cable length, the controller cancels the overrating mode of operation and the power output is set at the rated power.

As cable temperature is dependent on external factors which are not constant along the length of the cable, such as ambient temperature and the cable surroundings, local increases in cable temperature can occur along the cable length. For instance, local increases in temperature may occur where a cable is positioned close to other power cables, or where a section of the cable is buried and surrounded by material with low thermal conductivity, which inhibits the dissipation of heat. These local increases in cable temperature are termed "hotspots" and dictate the maximum current which can be safely carried by the cable. Such hotspots may occur at any point between any of the wind turbines and the grid connection point. For example, hotspots may occur in a collection cable running directly from an individual wind turbine, or in a collection cable running from a node and transporting power generated by a number of wind turbines.

Figure 7:
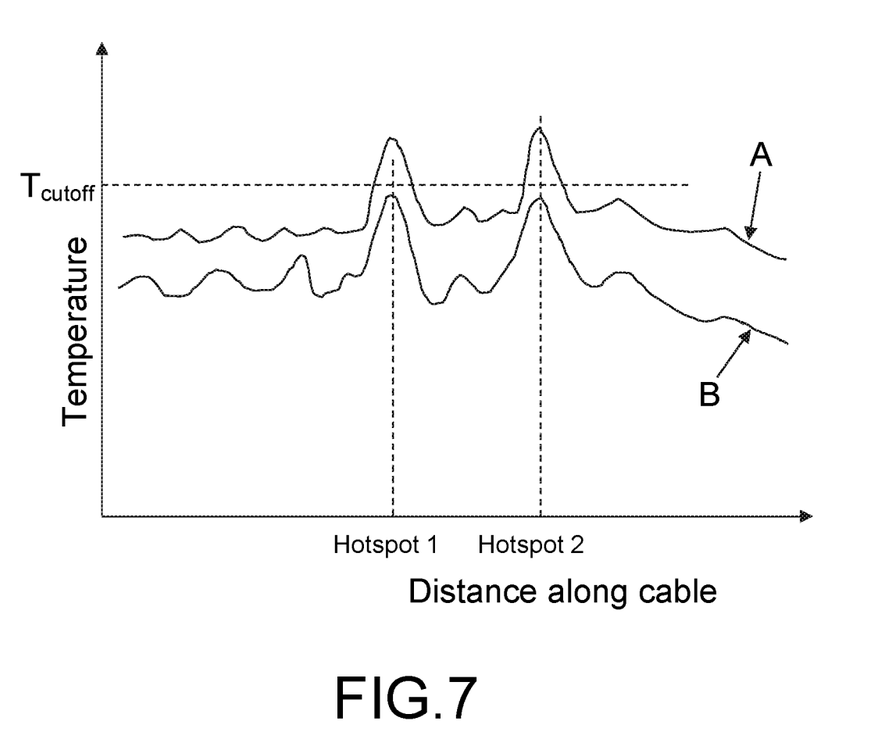
FIG. 7 is a graph of cable temperature against distance along the cable.

Due to the safety margins required to allow for inaccuracies in the calculated cable temperature, for example to account for a situation where the cable is buried and the material used to back-fill the trench differs from that assumed by the cable model, there may be significant differences in the calculated and actual cable temperatures, as illustrated in FIG. 7.

FIG. 7 illustrates an example variation in cable temperature along the length of a collection cable in which cable temperature is plotted on the y-axis and distance along the cable is plotted on the x-axis. The cable temperature calculated by the controller, including the safety margin, is shown as line A and the actual cable temperature is illustrated by line B. As can be seen, two main temperature hotspots occur along the length of the cable. The first of these occurs at approximately one third of the way along the cable and the second at approximately two thirds along the length of the cable. It is apparent that at points along the cable length there is a significant difference between the calculated cable temperature and the actual cable temperature. In particular, the temperature at the hotspots is calculated to exceed the maximum cable temperature, $T_{cut-off}$, whereas the actual temperature does not exceed the maximum cable temperature. Therefore, in this example, overrating of the turbine or turbines providing power to that cable will be cancelled by the controller and the lack of accurate information regarding cable temperature has led to an unnecessary reduction in power output.

Figure 8:
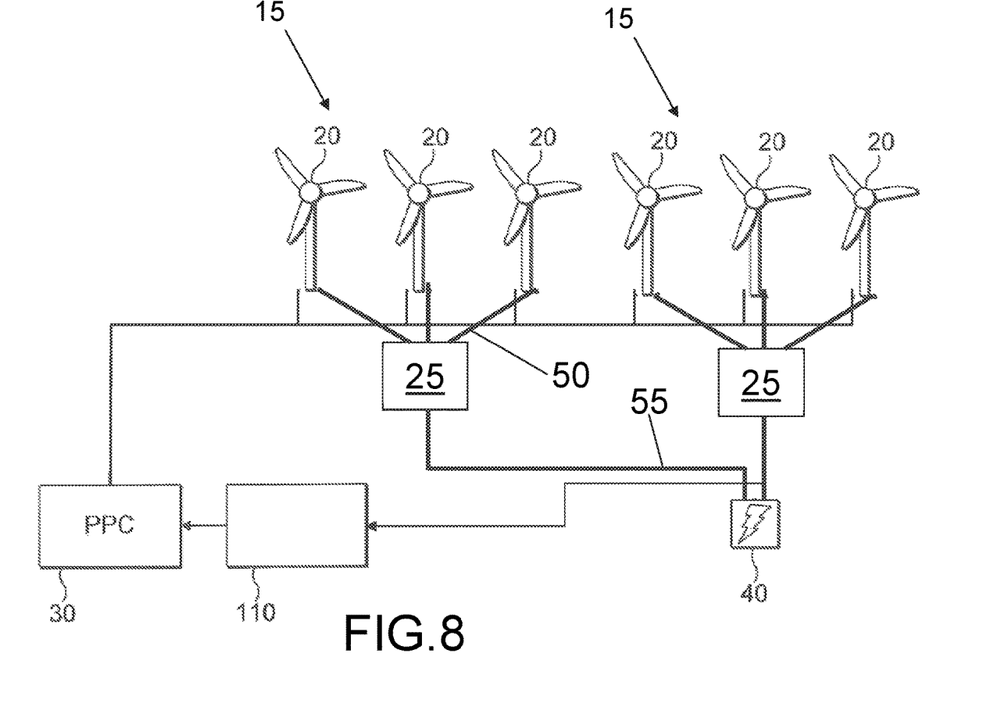
FIG. 8 is a schematic view of a wind power plant control regime in accordance with the present invention.

FIG. 8 shows, schematically, an arrangement according to a first embodiment of the present invention. In this embodiment, which is similar to the arrangements shown in FIGS. 2 and 5, the collection cables comprise one or more integral cable temperature sensors (not shown). The sensors monitor the temperature at the surface of the conductors of the collection cables 50, 55 and provide this information to the controller 110. The controller 110 then uses the cable temperature readings to determine the degree to which the turbines may be overrated. In particular, the controller 110 is programmed with one or more cable temperature set points, or thresholds, and reduces the amount of overrating if the measured cable temperature exceeds the programmed temperature set point(s).

For example, if the temperature sensors indicate that the temperature at any point along the length of a collection cable 50, 55 equals or exceeds the maximum allowable temperature, $T_{cut-off}$) the controller 110 may cancel the overrating control of a wind turbine 20 feeding power to that cable 50, 55 in the manner shown in FIG. 6. In this example, if the measured temperature exceeds or equals the temperature set point $T_{cut-off}$ the controller 110 sends an overrating control signal with a power reference set point having a value of $P_{ref}$=1.0. Thus, the controller 110 adjusts the overrating control signal to prevent overrating and instead instructs the turbine to output power at its rated power. This restricts the current carried by the collection cables 50, 55 to prevent damage caused by cable temperatures above the rated temperature of the cable.

Figure 9:
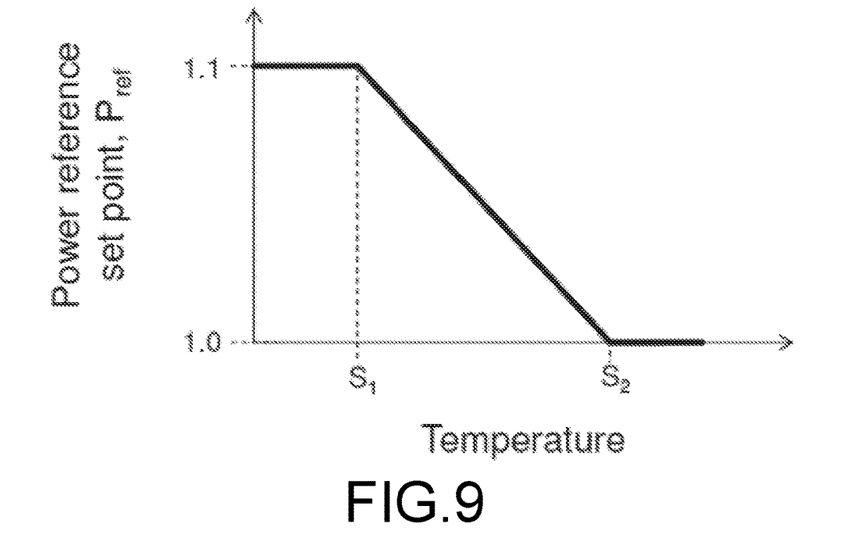
FIG. 9 is a graph illustrating proportional control of the amount of overrating in response to changes in cable temperature.

Alternatively, the controller 110 may adjust the overrating amount in the manner illustrated in FIG. 9. In FIG. 9, a lower limit temperature set point S1 is defined. Below temperature S1, over-rating control is fully activated and the power reference set point is at its maximum value of 1.1. At temperatures in excess of temperature S1, the controller reduces the power reference set point linearly from 1.1 to 1.0 as the temperature increases. At higher temperature limit, S2, the amount of over-rating is set to be zero. In one example, the control is implemented by a single set point S1 and an associated closed-loop control proportionally reduces the power reference over the predetermined range of temperatures (S1 to S2). In this example, the controller is only required to store a single new set point S1 and the parameters to implement the closed loop control. In another example, both temperature limits S1 and S2 may be stored as set points.

The over-rating controller operation illustrated in FIG. 9 provides smoother control at marginal operating conditions than the control of FIG. 8. In addition, such a system allows the controller to push closer to the maximum power level at which the turbine can generate at a sustainable level. In other words, as illustrated in FIG. 9, the set point S2 lies in the previous safety margin of FIG. 8, meaning that over-rating can take place over a larger range of temperatures, but at reduced levels to the previous case.

A wind turbine generator that operates for half the time at Pref=1.1 and half the time at Pref=1.0, controlled according to the over-rating control method of FIG. 8, would yield a mean power output of 105% rated power. In contrast, a generator controlled according to the over-rating control method of FIG. 9 may stabilise at an approximately constant value of Pref=1.07, yielding a mean power output of 107% rated power. This is particularly useful since the relationship between power and the heating of the cable is non-linear. That is, the majority of the temperature increase during over-rating occurs near to the maximum over-rated power (Pref=1.1).

Figure 10:
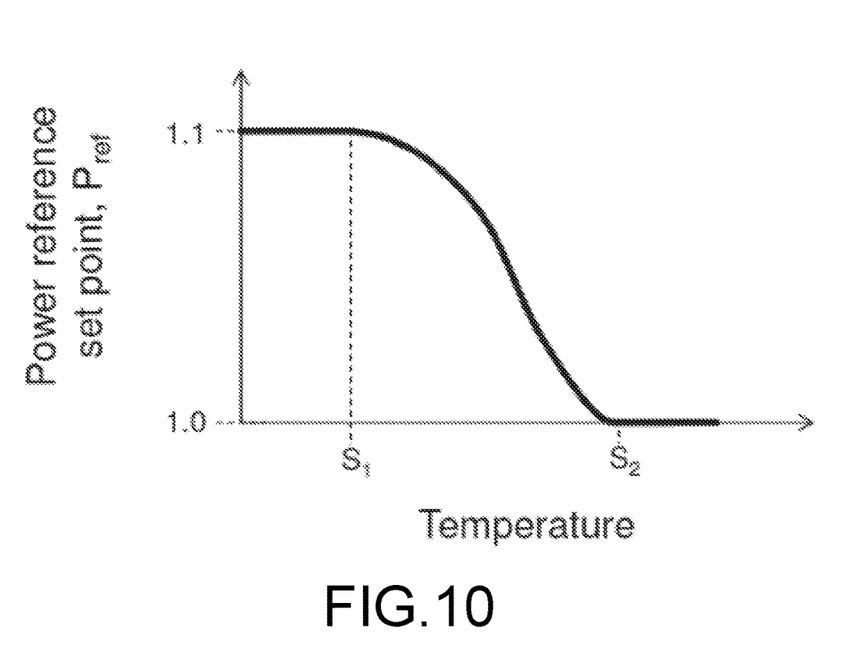
FIG. 10 is a graph illustrating non-linear control of the amount of overrating in response to changes in cable temperature.

In alternative examples, it may preferable to use a non-linear control relationship between the cable temperature and the power reference set point, as illustrated by the graph in FIG. 10.

Where the temperature sensors indicate that the temperature of a power collection cable 55 running from a node 25 equals or exceeds $T_{cut-off}$ for that cable, the controller 110 can adjust the overrating control signal for one or more of the wind turbines connected to the node 25.

The overrating control signal may be adjusted in the manner described above in relation to any of FIG. 6, 9 or 10. This restricts the power output of the cluster 15 of turbines 20 in the node 25 to prevent the temperature of the power collection cable 55 running from the node from exceeding the temperature rating of the cable.

In addition to restricting power output where certain temperature limits are equalled or exceeded, overrating can be reduced by the controller 110 where the amount of overrated production needs to be limited, for example due to external grid conditions. For example, the amount of over-rated production may need to be limited to 1.02 times rated power at a time when the individual turbines are able to deliver between 1.0 and 1.1 times rated power.

The controller 110 can use the temperature information from the various cable temperature sensors throughout the wind power plant to selectively constrain power production of the most heavily-loaded parts of the power plant to prolong cable life, even where cable temperature limits are not exceeded. The required production level can instead be achieved by distributing power generation to less heavily loaded parts of the wind power plant.

In an alternative embodiment (not shown) the controller 110 is sub-divided into several controllers, each arranged to control a group of wind turbines supplying the same cable. Although the arrangement is slightly different, the principles of operation are the same as described above. As a further alternative, the controller 110 could be further sub-divided to form part of the individual controller of each turbine.

Figure 11:
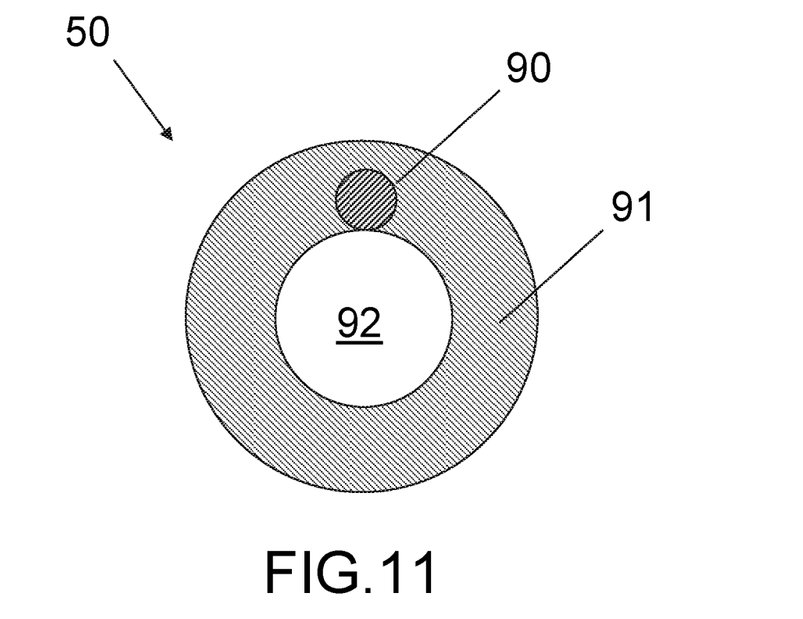
FIGS. 11 and 12 are cross-sectional views of cables for use with the present invention.
Figure 12:
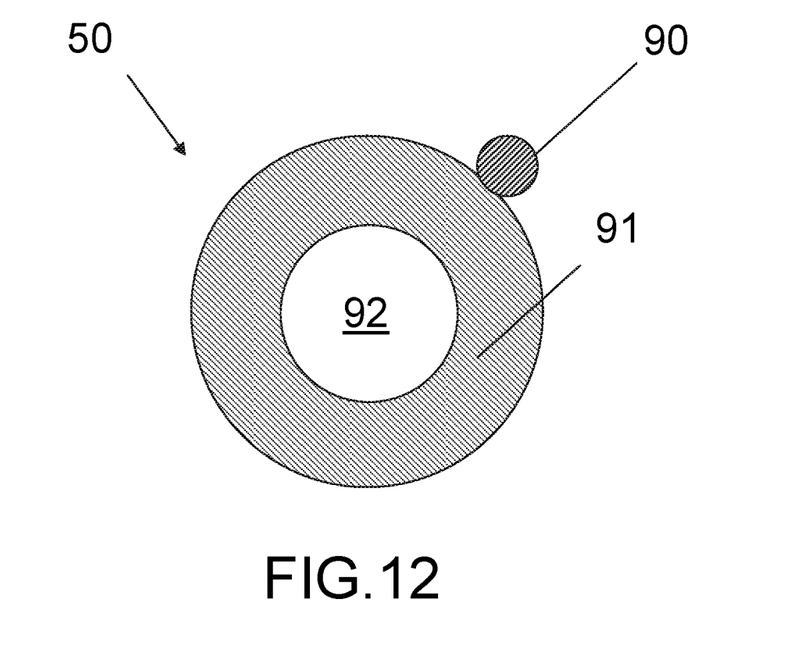

The cable temperature sensors may be of any suitable type. Preferably, the sensors are distributed temperature sensors, such as the Linear Power Series, available from AP Sensing GmbH of Böblingen Germany. These are passive optical sensing fibres which use the RAMAN effect to provide continuous distributed temperature monitoring along the length of the cable. Sensors 90 may be embedded in the insulation 91 of the cable 50 and, for example, adjacent to the cable conductor 92, as shown in FIG. 11. Alternatively, sensors 90 may be attached to and run alongside the insulation 91 of the cable 50, as shown in FIG. 12. As a further alternative, one or more sensors (not shown) may be attached to the cable 50 in specific locations along the length of the cable. However this is generally suitable only where the exact location of hotspots is already known.

Embodiments of the invention enable the amount of over-rating to be modified based on actual cable temperature measurements.

Since the actual cable temperature is known, embodiments of the invention enable a wind turbine to be operated within cable temperature rating limitations without the need for additional safety margins relating to cable temperature. Consequently, power output can be increased.

Many alternatives to the embodiments described are possible and will occur to those skilled in the art without departing from the scope of the invention which is defined by the following claims.

What is claimed is:

1. A method of controlling a wind turbine, the method comprising:
   generating and outputting an overrating control signal to the wind turbine, the overrating control signal setting an amount by which the power output of the wind turbine is to be overrated;
   measuring cable temperature values for at least one power collection cable connected to the wind turbine using at least one cable temperature sensor;
   determining whether the measured cable temperature values exceed a temperature set point; and
   modifying the overrating control signal to reduce the amount of overrating if the measured cable temperature values exceed the temperature set point.

2. The method according to claim 1, wherein modifying the overrating control signal comprises reducing the amount of overrating to zero.

3. The method according to claim 1 wherein modifying the overrating control signal comprises incrementally reducing the amount of overrating based on the extent to which the temperature set point is exceeded.

4. The method according to claim 1, wherein the at least one cable temperature sensor is integral with the at least one power collection cable.

5. The method according to claim 4, wherein the at least one cable temperature sensor is a distributed temperature sensor extending along a substantial part of the length of the at least one power collection cable.

6. A method of controlling a plurality of wind turbines connected to a common node from which power generated by the plurality of wind turbines is exported by at least one power collection cable, the method comprising:
   generating and outputting an overrating control signal to the plurality of wind turbines, the overrating control signal setting an amount by which the power output of the plurality of wind turbines is to be overrated;
   measuring cable temperature values for the at least one power collection cable using at least one cable temperature sensor;
   determining whether the measured cable temperature values exceed a temperature set point; and
   modifying the overrating control signal of at least one of the wind turbines to reduce the amount of overrating if the measured cable temperature values exceed the temperature set point.

7. A wind turbine control system comprising:
   at least one cable temperature sensor for measuring cable temperature values for at least one power collection cable connected to a wind turbine; and
   a controller arranged to generate and output an overrating control signal to the wind turbine, the overrating control signal setting an amount by which the power output of the wind turbine is to be overrated, determining whether the measured cable temperature values exceed a temperature set point and modifying the overrating control signal to reduce the amount of overrating if the temperature set point is exceeded.

* * * * *